United States Patent

Adams

Patent Number: 5,429,327
Date of Patent: Jul. 4, 1995

[54] ELECTRO-IMPULSE DE-ICER

[75] Inventor: Lowell J. Adams, Dayton, Ohio

[73] Assignee: The B.F. Goodrich Company, Akron, Ohio

[21] Appl. No.: 141,451

[22] Filed: Oct. 22, 1993

[51] Int. Cl.$^6$ ............................................. B64D 15/18
[52] U.S. Cl. ................................ 244/134 D; 244/134 R
[58] Field of Search .......................................... 244/134

[56] References Cited

U.S. PATENT DOCUMENTS

| | | | |
|---|---|---|---|
| 2,271,466 | 1/1942 | Schmidt | 244/134 D |
| 2,432,669 | 12/1947 | Klieven | 244/134 D |
| 3,809,341 | 5/1974 | Levin et al. | 244/134 R |
| 4,629,149 | 12/1986 | Carson et al. | 244/134 R |
| 4,678,144 | 7/1987 | Goehner et al. | 244/134 R |
| 4,895,322 | 1/1990 | Zieve | 244/134 R |
| 5,129,598 | 7/1992 | Adams et al. | 244/134 D |
| 5,152,480 | 10/1992 | Adams et al. | 244/134 D |
| 5,318,253 | 6/1994 | Levin | 244/134 D |

FOREIGN PATENT DOCUMENTS

| | | | |
|---|---|---|---|
| 865966 | 6/1941 | France | 244/134 A |
| 98343 | 3/1940 | Sweden | 244/134 A |
| 505433 | 12/1938 | United Kingdom . | |

*Primary Examiner*—Galen Barefoot
*Attorney, Agent, or Firm*—Kevin L. Leffel; Wayne D. Porter

[57] ABSTRACT

An electro-impulse de-icer for de-icing an aircraft structural member having an opening in the leading edge and including an inductor coil. The inductor coil is disposed either at least partially within the opening or adjacent to the opening. The de-icer further includes a movable metal target disposed in proximity with the coil. The target is supported by a flexible, ice-accumulating support member that permits the target to move relative to the coil and to the structural member. The support member is rapidly, and forcefully, displaced away from the coil and the structural member upon passing a short-duration, high-current pulse through the coil. The current flow creates an electromagnetic field that induces eddy currents in the target and the support member (if made of metal). Upon collapse of the electromagnetic field in the coil, the target and support member are pulled rapidly to their rest position.

32 Claims, 9 Drawing Sheets

ELECTRO-IMPULSE DE-ICER

BACKGROUND OF THE INVENTION

CROSS-REFERENCE TO RELATED PATENT

U.S. Pat. No. 4,875,644, entitled "Electro-Repulsive Separation System for De-Icing," the disclosure of which is incorporated herein by reference (hereinafter referred to as the "Electro-Repulsive Separation System for De-Icing Patent").

1. Field of the Invention

The invention relates to de-icers for aircraft and, more particularly, to de-icers that operate by deforming ice-accumulating surfaces.

2. Description of the Prior Art

The accumulation of ice on aircraft wings and other structural members in flight is a danger that is well known. As used herein, the term "structural members" is intended to refer to any aircraft surface susceptible to icing during flight, including wings, stabilizers, engine inlets, rotors, and so forth. Attempts have been made since the earliest days of flight to overcome the problem of ice accumulation. While a variety of techniques have been proposed for removing ice from aircraft during flight, these techniques have had various drawbacks that have stimulated continued research activities.

One approach that has been used extensively is so-called mechanical de-icing. In mechanical de-icing, the leading edges of structural members are distorted in some manner so as to crack ice that has accumulated thereon for dispersal into the airstream. A popular mechanical de-icing technique is the use of expandable tube-like structures that are periodically inflatable. Inflation of the structures results in their expansion or stretching by 40% or more. Such expansion typically occurs over approximately 2–6 seconds and results in a substantial change in the profile of the de-icer, thereby cracking accumulated ice. Unfortunately, expansion of the devices can negatively influence the airflow passing over the aircraft structure. Also, they are most effective when ice has accumulated to a substantial extent, approximately 0.25 inch or more, thereby limiting their effectiveness. Desirably, ice removal would be accomplished long before accumulations approximating 0.25 inch have occurred.

A more recent mechanical de-icing technique utilizes internal "hammers" to distort the leading edges of structural members. Such an-approach is disclosed in U.S. Pat. No. 3,549,964 to Levin et al., wherein electrical pulses from a pulse generator are routed to a coil of a spark-gap pressure transducer disposed adjacent the inner wall of the structural member. The primary current in the coil induces a current in the wall of the structural member and the magnetic fields produced by the currents interact so as to deform the member.

U.S. Patent Nos. 3,672,610 and 3,779,488 to Levin et al. and U.S. Pat. No. 4,399,967 to Sandorff disclose aircraft de-icers that utilize energized induction coils to vibrate or torque the surface on which ice forms. Each of these devices employs electromagnetic coils or magneto-restrictive vibrators located on the side of the surface opposite to that on which ice accumulates. In U.S. Pat. No. 3,809,341 to Levin et al., flat buses are arranged opposite one another, with one side of each bus being disposed adjacent an inner surface of an ice-collecting wall. An electric current is passed through each bus and the resulting interacting magnetic fields force the buses apart and deform the ice-collecting walls.

A more recent approach is shown by U.S. Pat. No. 4,690,353 to Haslim et al. In the '353 patent, one or more overlapped flexible ribbon conductors are imbedded in an elastomeric material that is affixed to the outer surface of a structural member. The conductors are fed large current pulses from a power storage unit. The resulting interacting magnetic fields produce an electro-expulsive force that distends the elastomeric member. The distension is almost instantaneous when a current pulse reaches the conductors, and is believed to be effective in removing thin layers of ice. Although the device disclosed in the '353 patent is believed to be an improvement over previous mechanical de-icing techniques, certain drawbacks remain. One of the drawbacks relates to the direction of current flow in adjacent electrically conductive members. It is believed that the current flow disclosed in the '352 patent produces inefficiencies that significantly restrict the effectiveness of the device.

The Electro-Repulsive Separation System for De-Icing Patent discloses a device that is an improvement over that disclosed in the '352 patent. In the Electro-Repulsive Separation System for De-Icing Patent, the electrically conductive members are arranged such that a greater electro-expulsive force can be generated than with the serpentine configuration disclosed in the '353 patent. Also, the Electro-Repulsive Separation System for De-icing Patent teaches the delivery of a current pulse of predetermined magnitude, shape and duration that provides more effective de-icing action.

Despite the advances taught by the prior art, particularly the Electro-Repulsive Separation System for De-Icing Patent, there remains a need for a de-icer that provides effective de-icing action. In particular, it is desired to have a de-icer that has the force-generating capabilities of various prior mechanical de-icers without the drawbacks associated therewith, such as large size, difficulty in retrofitting existing structural members, and other problems.

SUMMARY OF THE INVENTION

The present invention overcomes the foregoing drawbacks of the prior art and provides a new and improved de-icer especially adapted for use with structural members in which openings are formed in the leading edge thereof. In one embodiment of the present invention, a stationary inductor coil is disposed within one of the openings, and a target is disposed in proximity with the coil, either totally outside the opening or partially outside the opening and partially inside the opening. A deflectable member for supporting the target defines an ice-accumulating surface that constrains the target and permits it to move relative to the coil.

In another embodiment of the present invention, an opening is provided in the leading edge of a structural member and a coil is disposed within the structural member over the opening. The target includes a first portion that is disposed outside the opening, and/or a second portion that is disposed within the opening. That is, the target can be disposed completely within or completely outside of the opening. As with the first-described embodiment, a deflectable support member holds the target and permits it to move relative to the coil.

With each embodiment of the invention, the target and its support member are rapidly, and forcefully, displaced away from the coil upon passing a short-duration, high-current pulse through the coil. The current flow creates an electromagnetic field that induces eddy currents in the target and support member (if metal). Upon collapse of the electromagnetic field in the coil, the target and support member are pulled rapidly to their rest positions.

In contrast with prior mechanical de-icers, most of the forces that are applied to the structural member by the de-icer according to the invention are compressive forces that are more easily accommodated than the tensile forces that are produced by various other mechanical de-icers. Further, the device can be fitted to structural members without excessive difficulty, either as part of new construction or as a retrofit.

Because the device operates on an eddy current principle, it completely avoids problems arising from directional current flow, and it provides a more effective ice-shedding action than has been possible with previous devices. In part, the effectiveness of the device is enhanced because the ice-accumulating surface is displaced a relatively great distance at a high rate of acceleration. The efficiency of the device also is much greater than prior internally disposed eddy current de-icers because the coil and the target are in surface-to-surface contact with each other, or nearly so. The referenced internally disposed de-icers require a substantial gap between the coil and the structural member in order to prevent possible damage to the coil upon rebounding of the structural member. The efficiency of the present invention is high because the ice-accumulating surface that is displaced is relatively thin and is resiliently mounted to the structural member. In those de-icers that distort the structural member itself, the ice-accumulating surface is relatively thick and may be relatively difficult to distort.

These and other features, advantages and objects of the present invention will be further understood and appreciated by those skilled in the art by reference to the following written specification, claims and appended drawings.

DETAILED DESCRIPTION OF THE INVENTION

The present invention provides a technique especially adapted for de-icing the leading edges of structural members. De-icing is the removal of ice subsequent to its formation upon a leading edge. A leading edge is that portion of a structural member that functions to meet and break an airstream impinging upon the surface of the structural member. Examples of leading edges are the forward portions of wings, stabilizers, struts, nacelles, rotors, and other housings and protrusions first impacted by an airstream.

Figure 1:
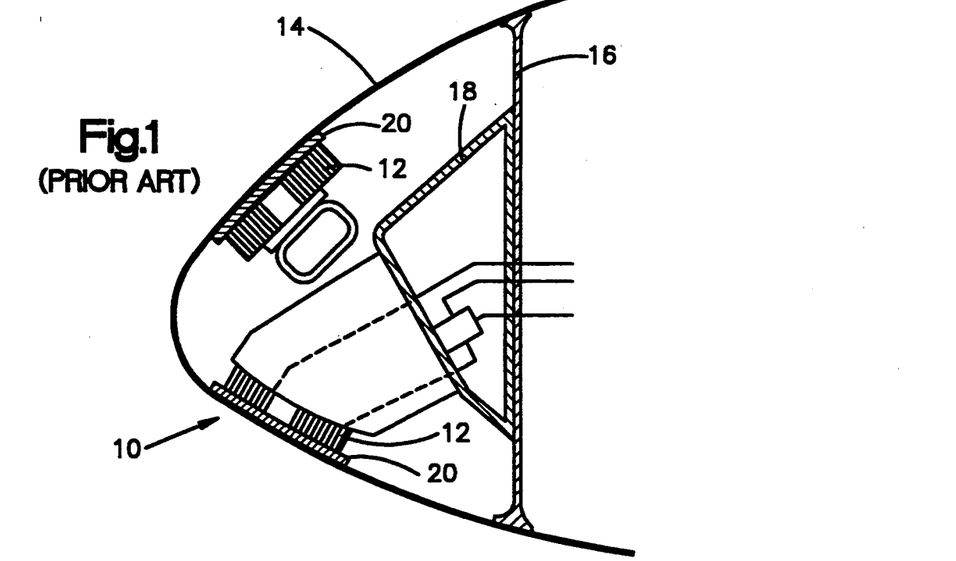
FIG. 1 is a schematic, cross-sectional view of a prior art mechanical de-icer.
Figure 2:
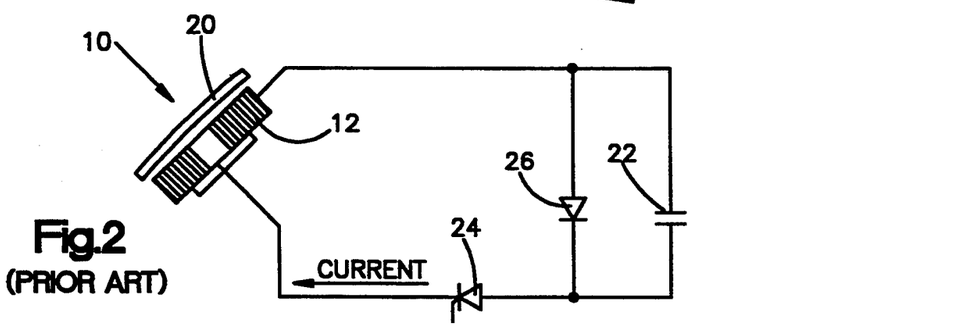
FIG. 2 is a schematic electrical circuit showing how the de-icer of FIG. 1 is activated.
Figure 3:
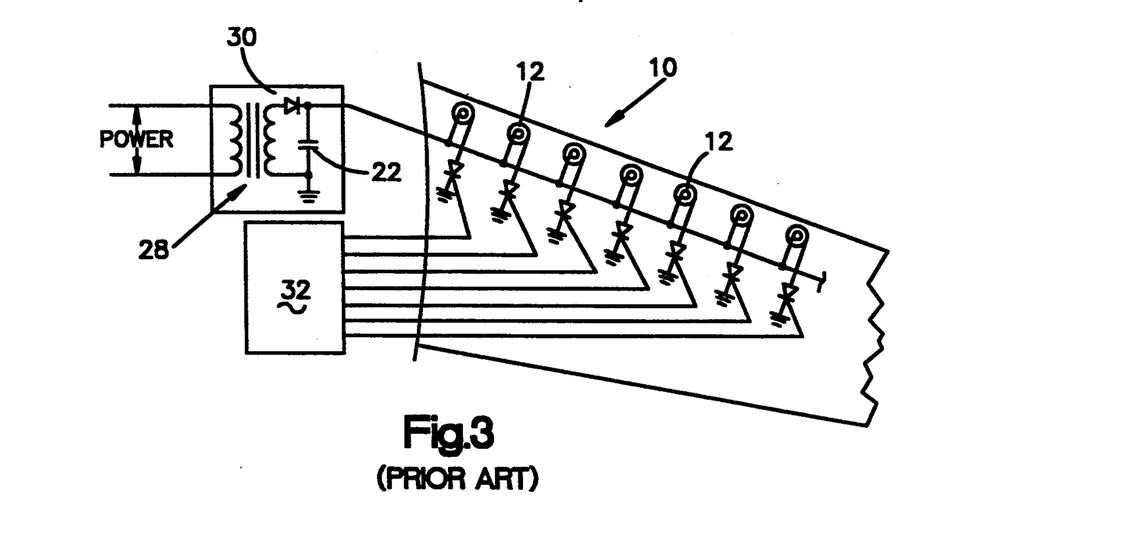
FIG. 3 is a schematic electrical circuit showing how a plurality of de-icers according to FIG. 1 can be installed in a structural member.

FIGS. 1-3 illustrate a known mechanical de-icer 10 and electrical circuitry therefor. The de-icer 10 includes first and second coils 12 that are disposed within a structural member (such as a wing) 14 near the inner surface of the leading edge of the structural member 14. The outer surface of the structural member 14 is made of metal such as aluminum which will be referred to as the "skin." The coils 12 are mounted to a spar 16 by means of a mounting bracket 18. The coils 12 are circular in plan view. A circular, unalloyed aluminum disk 20 is bonded to the inner surface of the leading edge directly opposite each of the coils 12.

Referring to FIG. 2, each coil 12 is connected in series with an energy storage capacitor 22 and a thyristor 24. A diode 26 is connected in parallel with the capacitor 22. An electrical impulse is initiated by supplying a trigger pulse to the thyristor 24, allowing the capacitor 22 to discharge through the coil 12. Because the thyristor 24 has diode properties, the current follows the first positive loop of the RLC response, after which the thyristor 24 reopens the circuit. This leaves the capacitor 22 reverse-charged. Such reverse-charging reduces capacitor life substantially. For that reason, the diode 26 is placed across the capacitor 22.

Referring to FIG. 3, a typical spanwise installation of the coils 12 within a wing is shown. Each of the coils 12 is separated laterally from other coils 12 by about 16 inches. The coils 12 are supplied a single power unit 28 that includes a transformer 30. The capacitor 22 is connected across the secondary side of the transformer 30. A switching device 32 is connected to each of the thyristors 24 in order to provide a trigger pulse to the thyristors 24.

When the capacitor 22 is discharged through each coil 12, a rapidly forming and collapsing electromagnetic field is created that induces eddy currents in the disk 20 and the metal skin of the structural member 14. The electromagnetic fields resulting from current flow in the coil 12, the disk 20, and the skin of the structural member 14 create a repulsive force of several hundred pounds magnitude, but with a duration of only a fraction of a millisecond. A small amplitude, high acceleration movement of the skin of the structural member 14 acts to shatter, debond, and expel the ice. Two or three such "hits" are performed in short order, separated by the time required to recharge the capacitor 22, and then ice is permitted to accumulate again until it approaches an undesirable thickness. By appropriate control of the switching device 32, the coils 12 can be activated sequentially in order to create a "ripple" effect that is believed to be more effective in shedding ice due to the propagation of skin movement in both chordwise and spanwise directions.

As will be appreciated from the foregoing description, the referenced de-icer 10 depends upon deformation of the skin for its effectiveness. The displacement of the metal surface subject to icing is very limited. Typically, it requires three impact pulses to remove accumulated ice under all icing conditions. Further, although the skin is displaced only to a limited extent, it is necessary to produce strong forces in order to accomplish even that limited displacement. An additional problem is that the forces are "negative" forces in that they apply a tensile load to the leading edge. Aircraft structural members are designed to better withstand compressive loads, rather than tensile loads.

Figure 4:
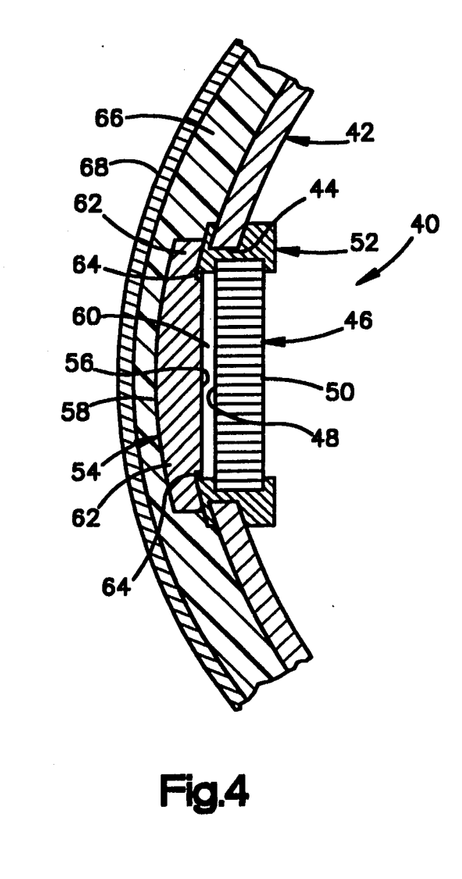
FIG. 4 is a cross-sectional view of a de-icer according to the invention in which an opening is formed in the leading edge of an aircraft structure and in which a flat coil as well as a target having a flat inner surface and a contoured outer surface are used.

Referring now to FIG. 4, a de-icer according to the invention is indicated by the reference numeral 40. The de-icer 40 is similar to the de-icer 10 in that it employs a coil and a target that is movable relative to the coil. However, as will be discussed below, the de-icer 40 differs significantly from the de-icer 10. The differences will be apparent from the description that follows.

The de-icer 40 as shown in FIG. 4 is securely attached to the leading edge of a structural member. The leading edge, or skin, of the structural member is indicated by the reference numeral 42. Typically the skin 42 will be made of metal such as an aluminum alloy, or it will be made of a composite non-metal material such as graphite/epoxy.

The skin 42 includes an opening 44 at or near the center of the leading edge. A disk-like coil 46 is disposed at least partially within the opening 44. In each of the embodiments of de-icers 40 (FIGS. 4-15), the coil is insulated to avoid arcing between the skin 42 and coil 46 when current is transmitted to the coil 46. The coil 46 includes front and back surfaces 48 and 50, both of which are flat. Hereinafter, the coil 46 will be referred to as "flat coil" 46, but, as explained in further detail below, a contoured coil can be used effectively with the present invention. If the thickness of the skin 42 is greater than the thickness of the coil 46, the coil 46 may be disclosed completely within the opening 44.

A retainer 52 is attached to the skin within the opening 44 to hold the flat coil 46 securely in place. A plate-like target 54 generally coterminous with the opening 44 overlies the flat coil 46 and includes a flat back surface 56 that conforms to the front surface 48 and an opposing contoured front surface 58 that conforms approximately to that of the skin 42. In each of the embodiments of de-icer 40 (FIGS. 4-15) the target 54 is made of metal, such as copper or 1145 aluminum. When the retainer 52 is made from an insulating material, it serves to prevent any arcing that might occur between the skin 42 and the target 54.

The surfaces 48 and 56 preferably are in contact with each other or are spaced a small distance from each other by a gap 60, which gap 60 is preferably no greater than about 0.005 inch. A circumferentially extending flange 62 extends from the periphery of the target 54 for engagement with the retainer 52. A small gap 64 is maintained about the periphery of the target 54. An elastomeric layer or member 66 and a metal surface ply 68 form a deflectable support member that carries the target 54 and permits the target 54 to move relative to the coil 46. In the preferred embodiment, a portion of either the elastomeric layer 66 or the surface ply 68 is bonded to an outer surface of the skin 42.

Figure 16:
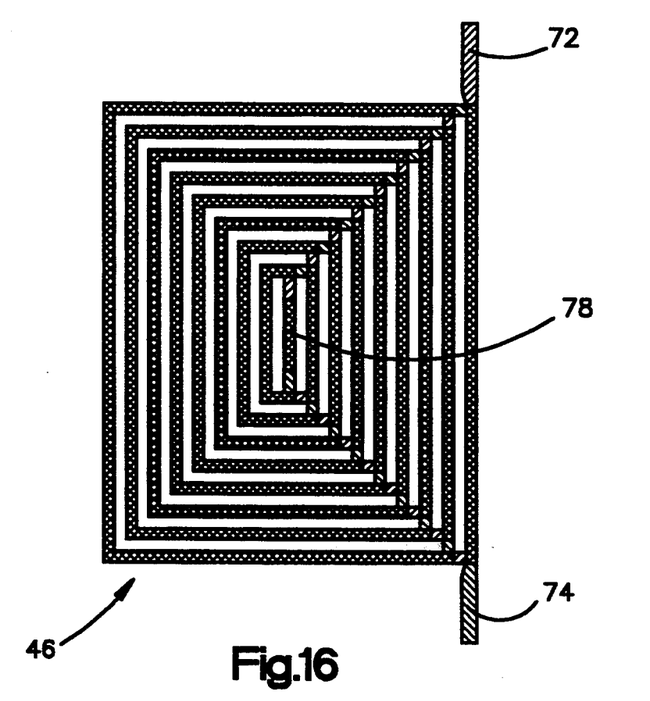
FIGS. 16 is a top plan view of a planar coil usable with the present invention.

Referring to FIG. 16, a construction used to implement the preferred embodiment of the coil 46 is illustrated. The coil 46 of FIG. 16 includes overlapped planar coils which are connected at a junction 78. Current flows in one direction from an input 72 to an output 74. A complete discussion of this construction is made available in U.S. Pat. No. 5,152,480 PLANAR COIL CONSTRUCTION, Adams et al. (hereinafter referred to as the "Planar Coil Construction Patent"), the disclosure of which is incorporated herein by reference.

Figure 17:
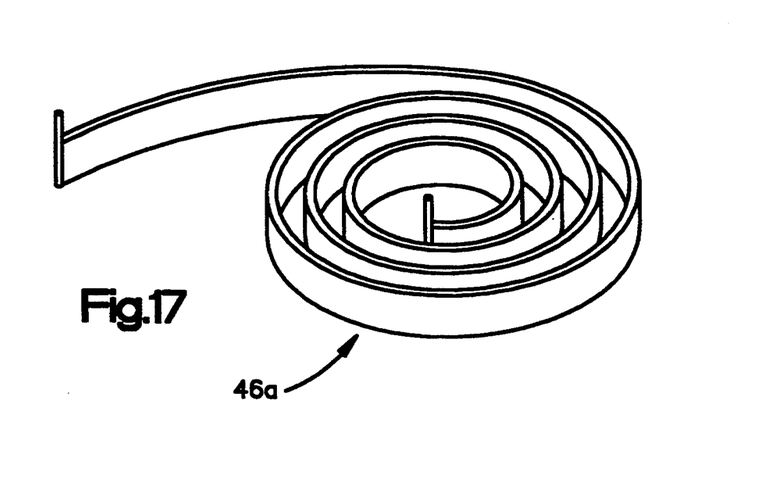
FIG. 17 is a perspective view of a spiral-wound coil usable with the present invention.
Figure 18:
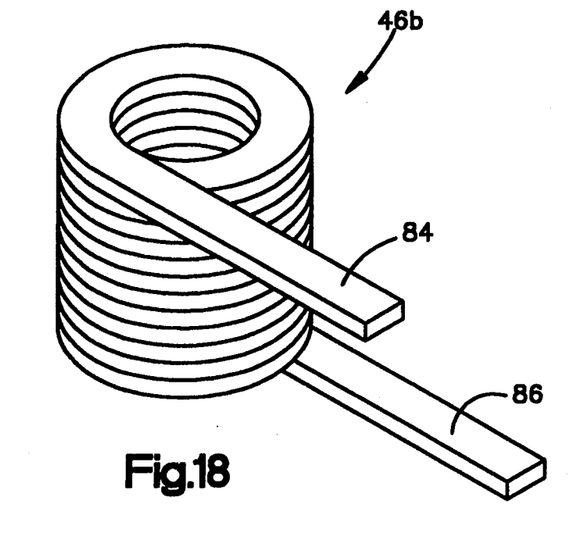
FIG. 18 is a perspective view of a helical coil usable with the present invention.
Figure 19:
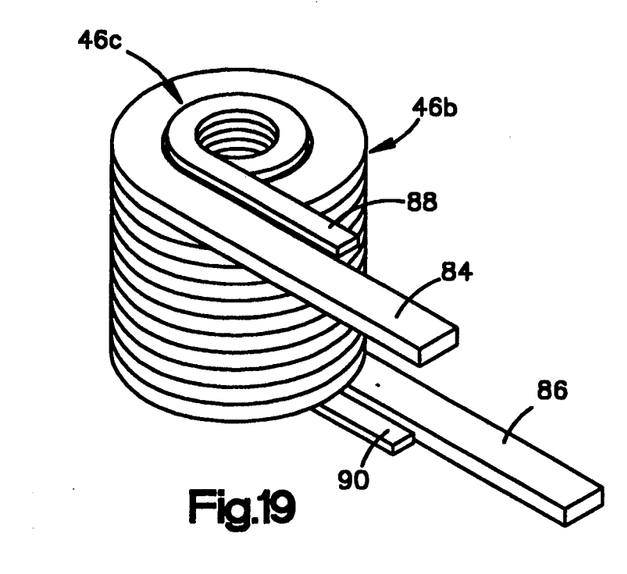
FIG. 19 is a perspective view of two helical coils, one disposed inside the other, that are usable with the present invention.

Referring to FIGS. 17–19, other suitable configurations of the coil 46 are shown. In FIG. 17, the coil 46 is formed as a spiral coil 46a. A detailed discussion of the coil 46a is made available in U.S. Pat. No. 5,129,598 ATTACHABLE ELECTRO-IMPULSE DE-ICER, Adams et al. (hereinafter referred to as the "Attachable Electro-Impulse De-Icer Patent"), the disclosure of which is incorporated herein by reference. The coil 46a preferably has a width of approximately 0.19 inch and a thickness of approximately 0.025 inch.

Referring to FIG. 18, the coil is in the form of an insulated, helical flat coil 46b having an outer diameter of about 2.25 inches and an inner diameter of about 1.75 inches. Legs 84 and 86 project from the ends of the coil for connection to a source of current.

In FIG. 19, the coil 46b is employed in conjunction with a second, smaller, helical coil 46c that fits within the inner diameter defined by the larger coil 46b. The coil 46c employs legs 88 and 90 for connection to a source of electrical current.

The de-icer 40 preferably includes the planar coil 46. In contrast to coils 46a–46c, shown in FIGS. 17–19, which tend to be relatively thick and bulky, the planar coil 46 is relatively thin and easy to handle. A light, compact coil, such as planar coil 46, is desired in aircraft applications in which weight and size of the de-icer preferably is minimized.

Figure 23:
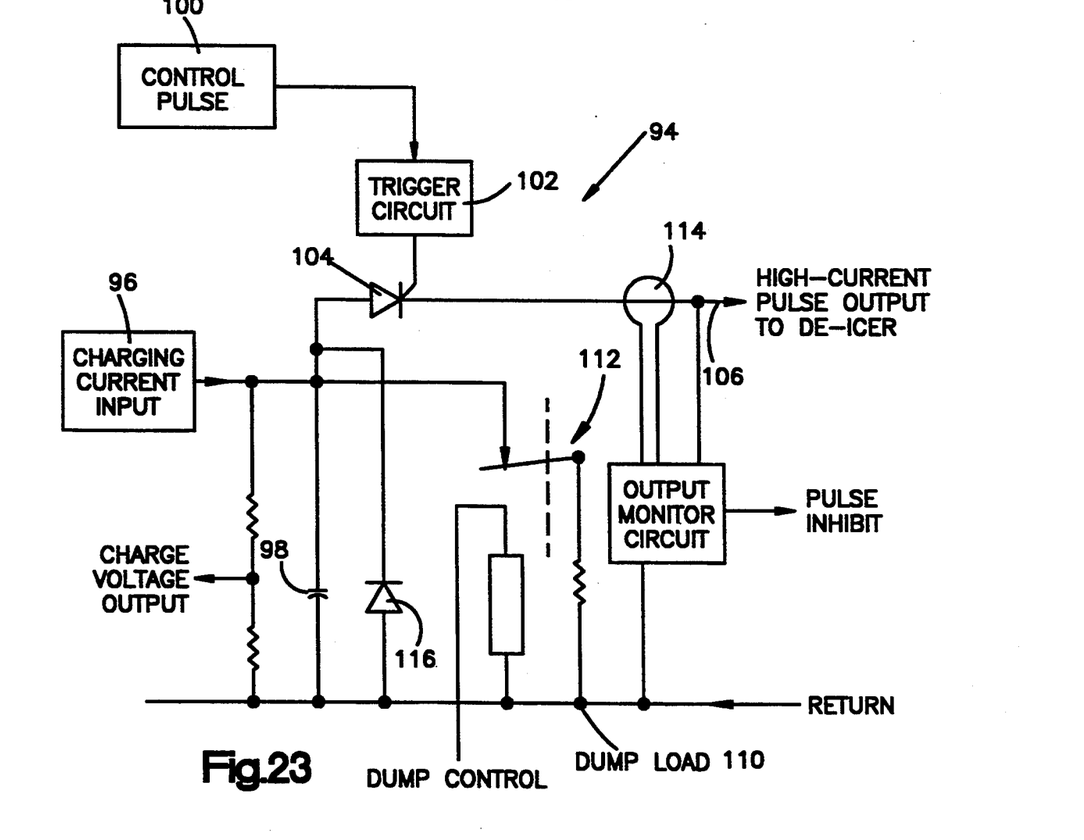
FIG. 23 is a schematic electrical circuit diagram for a de-icer according to the invention.

Referring to FIG. 23, a control circuit for use with the de-icers of the present invention is indicated by the numeral 94. The charging circuit 96 charges up a bank of capacitors 98 (only one is illustrated for simplicity) which serve as high voltage energy storage devices. When de-icing action is desired, a control pulse 100 is fed to a triggering circuit 102 which enables discharge of the capacitor bank 98 through one or more silicon control rectifiers (SCRs) 104 to provide a high current pulse output 106 to one or more of the coils 46.

Referring further to the control circuit 94 depicted in FIG. 23, whenever an output current pulse 106 is desired, the dump load 110, which maintains the capacitor bank 98 in a discharged condition, is removed by opening switch 112. Charging current from charging circuit 96 charges the capacitor energy storage bank 98 to the desired voltage. When the SCR 104 is triggered on, the capacitor bank 98 is discharged into one of the coils 46 (not illustrated in FIG. 23), providing the high current pulse 106, whose current magnitude is monitored by means of current transformer 114.

Figure 24:
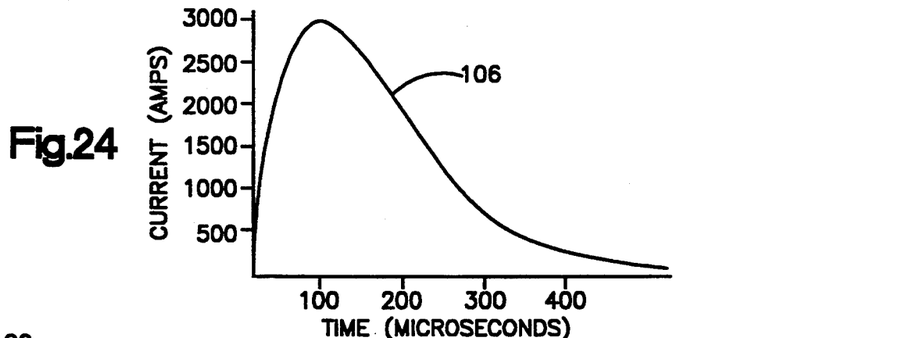
FIG. 24 is a plot of current versus time showing the profile of a current pulse used with the present invention.

Referring to FIG. 24, the current pulse 106 may be a clean, overdamped exponentially decaying sinusoidal wave form that is achieved by setting appropriate RLC values for the control circuit 94. In the event that the component values of the control circuit 94 are selected in a known manner, such that the circuit 94 may become underdamped or oscillatory in nature, the circuit 94 should be configured such that a rectifier 116 (FIG. 23) dumps the stored energy of the circuit inductance into the de-icing load, producing a single, non-oscillatory pulse having an extending, trailing edge.

In operation, the coil 46 is connected to a source of electrical energy such as that indicated in FIG. 23. The capacitor 98 should have a capacitance of about 500 microfarads. Upon discharge of the capacitor 98, a short-duration, high-current, high-voltage flow of electricity will be discharged through the coil 46. If the coil 46 is a four-layer planar coil, the current flow will be about 3,000 amps at 1,500 volts. The coil rise time will be about 100 microseconds, and the delay will be about 200–300 microseconds. A strong electromagnetic field will be generated that will induce eddy currents in the target 54. In turn, an electromagnetic field is generated by the target 54. The electromagnetic fields thus generated create a large repulsive force having a duration of only a fraction of a millisecond. The impact force is transferred by the target 54 to the surface ply 68, creating a small-amplitude, high-acceleration movement of the surface ply 68 that is sufficient to break up and shed any ice that has been formed.

Figure 25:
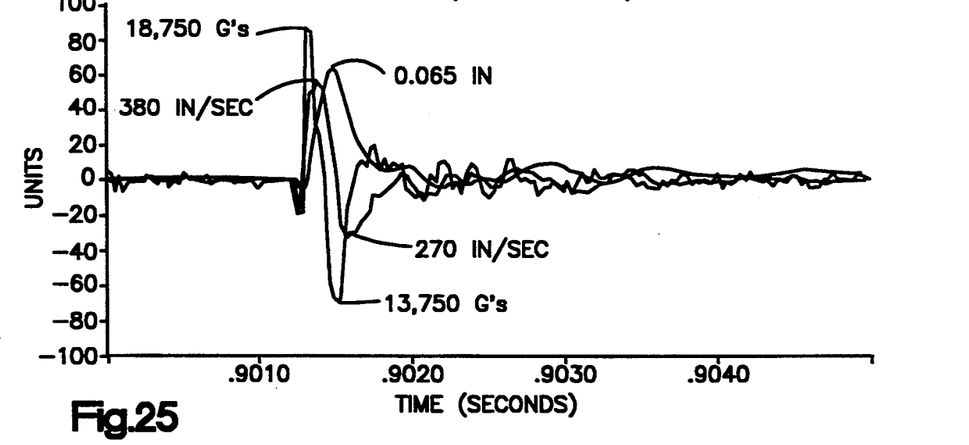
FIG. 25 is a plot of displacement, velocity and acceleration versus time showing the movement of a support member according to the invention.

Referring to FIG. 25, results relating to the displacement of surface ply 68 are shown. The significance of these results is discussed in the Attachable Electro-Impulse De-Icer Application.

Figure 5:
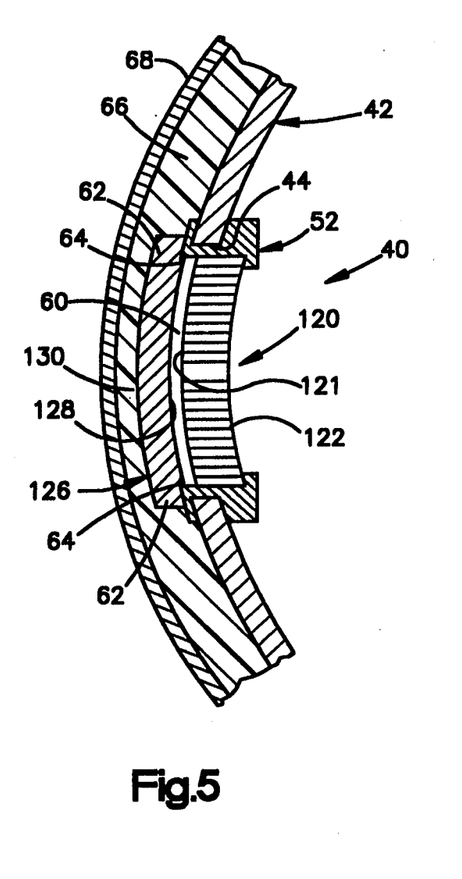
FIG. 5 is a cross-sectional view similar to FIG. 4 wherein a contoured coil and a contoured target are used.

In FIG. 5, an embodiment of de-icer 40, including a contoured coil 120, having front and back surfaces 121 and 122, is shown. Both surfaces 121 and 122 conform approximately to the shape of skin 42, and the contoured coil 120 is disposed at least partially within the opening 44. In one example, the contoured coil 120 is formed by molding one of the coils 46–46a into the desired contoured shape. A plate-like target 126 is provided generally coterminous with the opening 44 and having a contoured back surface 128, the surface 128 corresponding in shape to the front surface 121 of the contoured coil 120, and a contoured front surface 130, the surface 130 corresponding to the surface of the skin 42. The components used to support and/or retain both the coil 120 and the target 126 are the same as those used for the de-icer 40 of FIG. 4.

Figure 6:
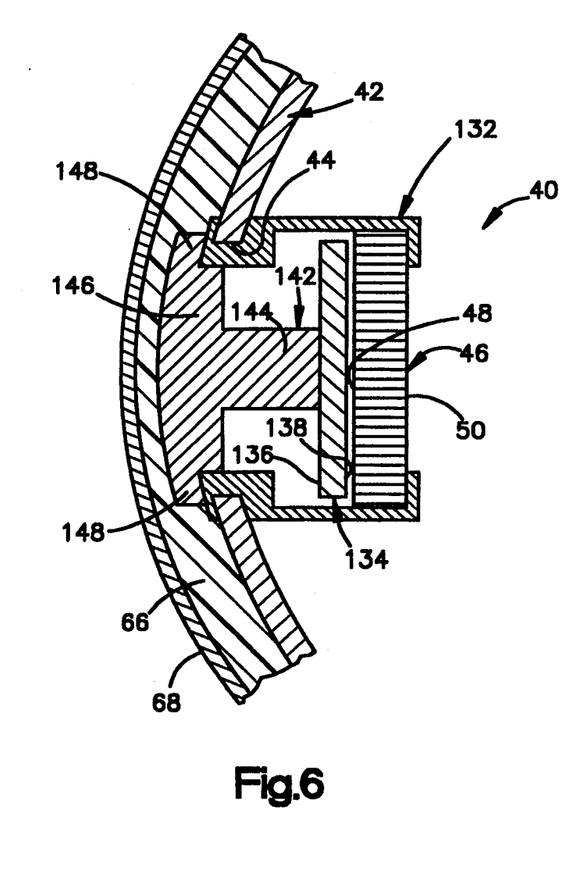
FIG. 6 is a cross-sectional view similar to FIG. 4 wherein a flat coil is disposed within the structural member, a flat target is disposed within the structural member, and a force transfer member projects through the opening forwardly of the structural member.

In FIG. 6, the flat coil 46 is disposed relatively far from the opening 44 within the structural member as defined by the skin 42. The flat coil 46 is held in place by an elongate retainer 132. A plate-like target 134 generally coterminous with the opening 44 and having flat surfaces 136 and 138 is provided. A force transfer member 142 is connected to the flat target 134. The force transfer member includes a stem 144 that projects forwardly of the target 134. The stem 144 is attached to the back surface of a plate-like element 146 which is disposed at the forward end of the stem 144 over the opening 44. The stem 144 protrudes through the opening 44. The element 146 includes a circumferentially extending flange 148 that projects from its periphery for engagement with the retainer 132. An elastomeric layer or member 66 and a metal surface ply 68 form a deflectable support member that carries the element 146 and permits the element 146 to move relative to the coil 46. As will be explained in further detail below, pursuant to a discussion of FIG. 11, the force transfer member 142 can be configured to permit considerable reduction of the circumference of opening 44.

Figure 7:
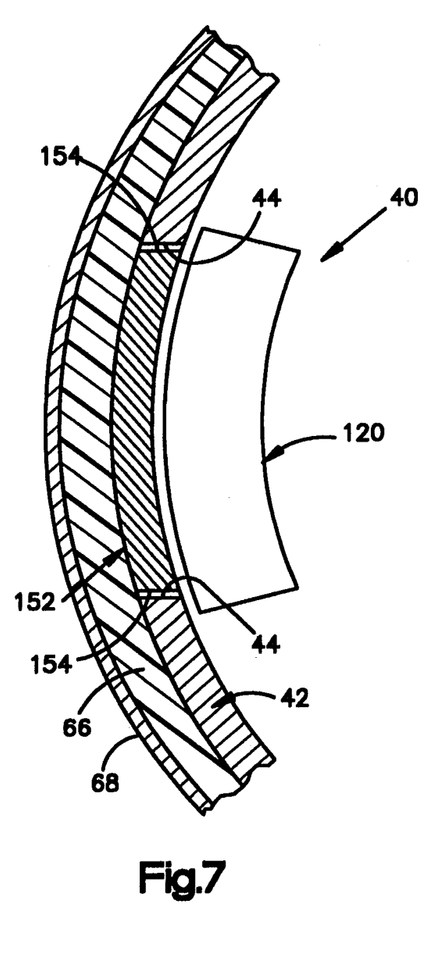
FIG. 7 is a cross-sectional view similar to FIG. 4 of a de-icer wherein a contoured coil is disposed entirely within the structural member and a contoured target is disposed entirely within the opening.

Referring to FIG. 7, the contoured coil 120 is shown adjacent to the skin 42 within the structural member as defined by the skin 42. While the de-icers 40 of FIGS. 7–15 are shown without any sort of mounting mechanism for coils 46 and 120, it should be understood that coils 46 and 120 are mounted to the skin 42 by use of the retainer 52 (FIGS. 4 and 5) or other known mounting mechanisms. A target 152 generally coterminous with the opening 44, which approximates the size of the opening 44, is completely disposed within and substantially fills the opening 44. Additionally, the target 152 is mounted flush with a surface of the layer 66, and a clearance gap 154 is maintained between target 152 and skin 42. When the target 152 substantially fills the opening 44 and is mounted along layer 66, generated electromagnetic interference ("EMI") should be reduced considerably. EMI shielding should be further enhanced by positioning an EMI shielded gasket (not shown) in the clearance gap 154.

Figure 8:
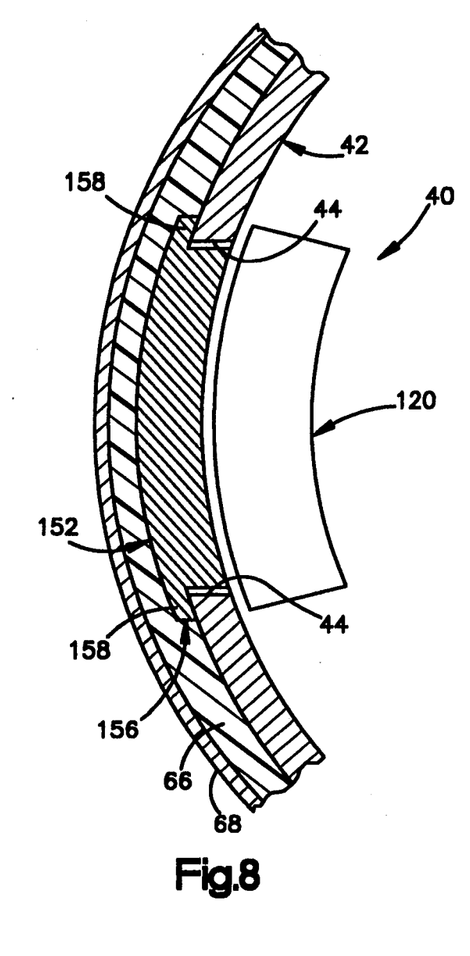
FIG. 8 is a cross-sectional view similar to FIG. 4 wherein a contoured coil is disposed within the structural member and a contoured target is disposed partially outside the opening and partially inside the opening.

In FIG. 8, a construction similar to that of FIG. 7 is illustrated, except that the target 152 is only partially disposed within the opening 44 such that portion 156 projects forwardly of the opening 44. The portion 156 is generally coterminous with the opening 44 includes a flange 158 that extends beyond the circumference of the opening 44 around the periphery of the target 152. It should be appreciated that overlapping the opening 44 with flange 158 should further enhance EMI shielding.

Figure 9:
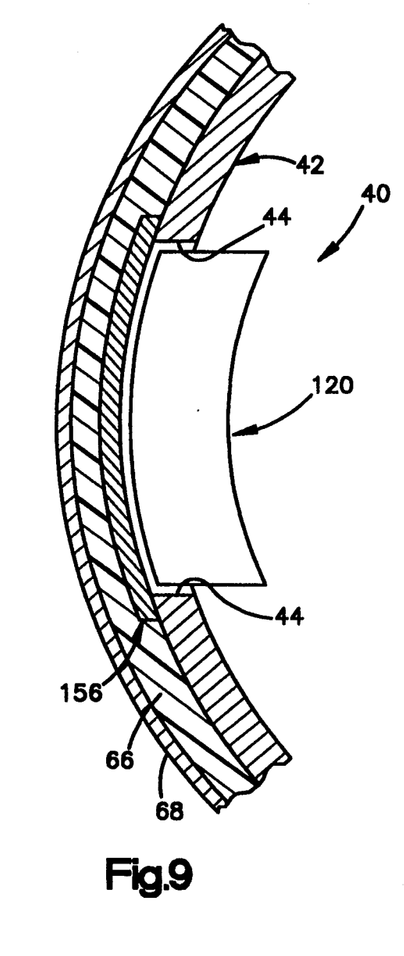
FIG. 9 is a cross-sectional view similar to FIG. 4 wherein a contoured coil is disposed partially within the opening and a contoured target is disposed outside the opening.

In FIG. 9, a construction similar to that of FIG. 8 is illustrated, except that only portion 156 is used as the target and the coil 120 is disposed at least partially within the opening 44. The backside of portion 156 can be insulated from the skin 42 to prevent arcing due to the high eddy current in portion 156.

Figure 10:
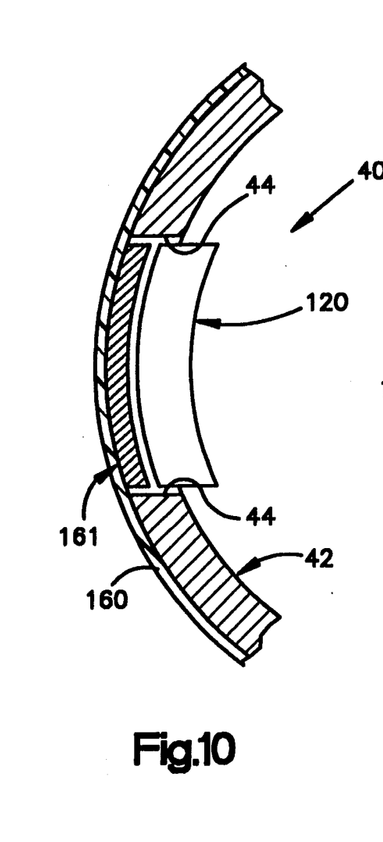
FIG. 10 is a cross-sectional view similar to FIG. 4 of a so-called "thin construction" embodiment of the invention wherein a contoured coil is disposed within the structural member and a contoured target is disposed within the opening.

In FIG. 10, a so-called "thin" construction similar to that of FIG. 7 is illustrated. In this embodiment of the invention, a surface ply 160 of elastomer or thin metal foil is bonded to the leading edge of the skin 42. A plate-like target 161 is generally coterminous with the opening 44 and bonded to the inner surface of the ply 160. The coil 120 is disposed at least partially within opening 44, while the target 161 can be insulated electrically from skin 42 to prevent electrical arcing between the skin 42 and the target 161.

Figure 11:
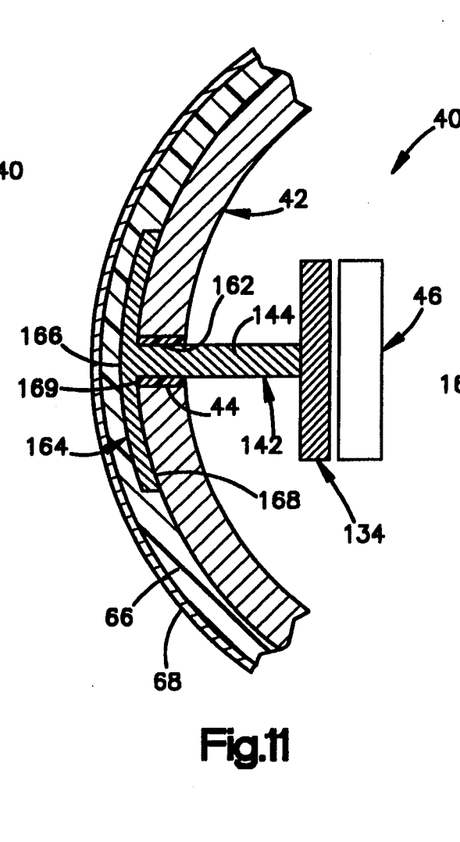
FIG. 11 is a cross-sectional view similar to FIG. 6 of a so-called "large radius" embodiment of the invention.

In FIG. 11, a configuration suitable for de-icing a large-radius structural member is illustrated. This embodiment of the invention is similar to that illustrated in FIG. 6, except that the opening 44 is relatively small, with only a small clearance gap 162 being provided between the stem 144 and the opening 44. Additionally, a plate-like element 164, having contoured surfaces 166 and 168 is provided. The surface area of the opening 44 is substantially smaller than the surface area of the plate-like element 164. Use of relatively small openings 44 is advantageous to the functioning of the de-icer 40 since it is undesirable, from a structural standpoint, to alter the skin 42 significantly by using large openings 44. Generated EMI should be reduced by positioning a shielded gasket 169 in the gap 162.

Figure 12:
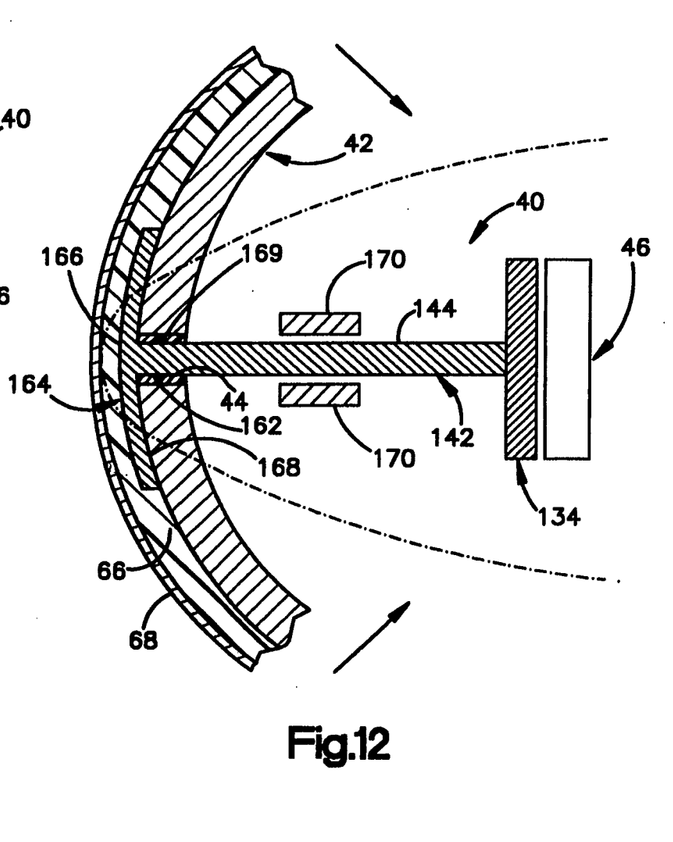
FIG. 12 is a cross-sectional view similar to FIG.11 of a so-called "small radius" embodiment of the invention wherein guide members are used to constrain the movement of a stem of a force transfer member.

In FIG. 12, an embodiment of the invention suitable for de-icing of a structural member having a small radius is illustrated. This embodiment of the invention is similar to the embodiment illustrated in FIG. 11, except that components, such as the plate-like element 164, are adapted to accommodate the smaller curvature of radius of the skin 42. Moreover, the stem 144 is longer and is constrained from lateral movement by a guide 170.

Figure 13:
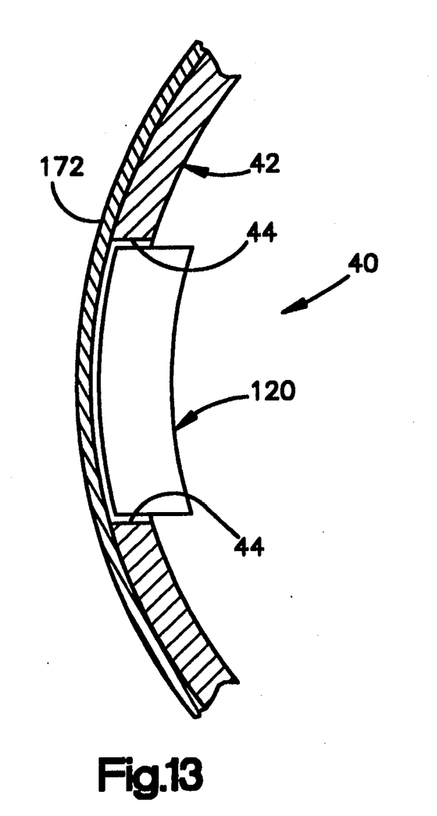
FIG. 13 is a cross-sectional view of a de-icer in which a contoured coil is disposed partially within the opening and a contoured target in the form of a single thin surface ply is disposed outside the opening.

Referring to FIG. 13, a de-icer 40, which uses a portion of a thin, metal surface ply 172 as a target, is shown. In this embodiment, the coil 120 is at least partially disposed within and substantially fills the opening 44, and the thin, metal surface ply 172 overlies the opening 44. A portion of ply 172 is bonded or otherwise securely attached to the skin 42. The coil 120 can alternatively be spaced from an inner surface of skin 42, provided that the resulting gap between the coil 120 and ply 172 allows for acceptable levels of displacement of ply 172. The ply 172, which is made of metal such as copper, functions as both a target and a surface ply upon which ice can accumulate. It should be recognized that the de-icer 40 of FIG. 13 is most effective when a substantial amount of eddy current can be generated in the ply 172. Moreover, the embodiment of FIG. 13 is exceedingly economical since weight is minimized through the elimination of certain components, such as the elastomeric layer 66.

Figure 14:
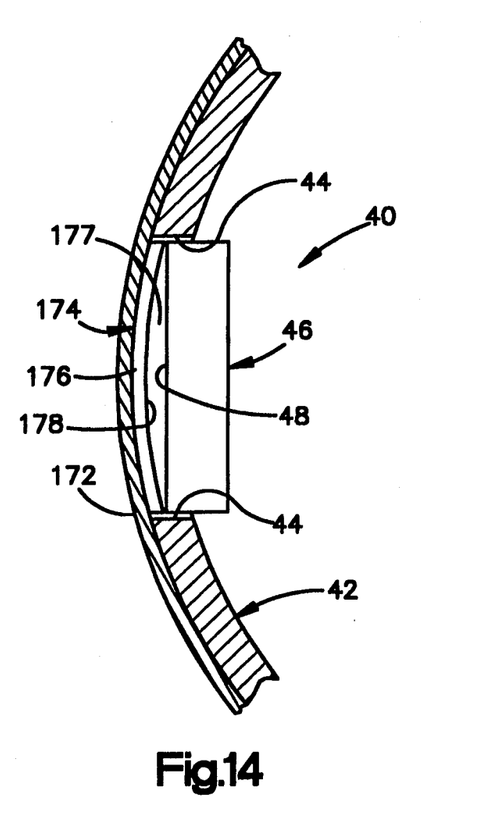
FIG. 14 is a cross-sectional view similar to FIG. 13 wherein a flat coil is disposed partially within the opening, a contoured target is disposed within the opening and the flat coil is spaced from the contoured target by a non-uniform gap.

In FIG. 14, an embodiment similar to that shown in FIG. 13 is illustrated, except that a contoured metal plate-like target 174 is mounted to the ply 172 completely within and substantially filling the opening 44. The flat coil 46 is positioned near the target 174 at least partially disposed within the opening 44. Additionally, the target 174 has a front surface 176 and a back surface 178, the front surface 176 being bonded to the ply 172. Since the back surface 178 of target 174 is contoured and the front surface 48 of flat coil 46 is flat, a non-uniform gap 177 is formed between the coil 46 and the target 174. As can be appreciated, the use of the non-uniform gap 177 allows for the contouring of force distribution across the target 174.

Figure 15:
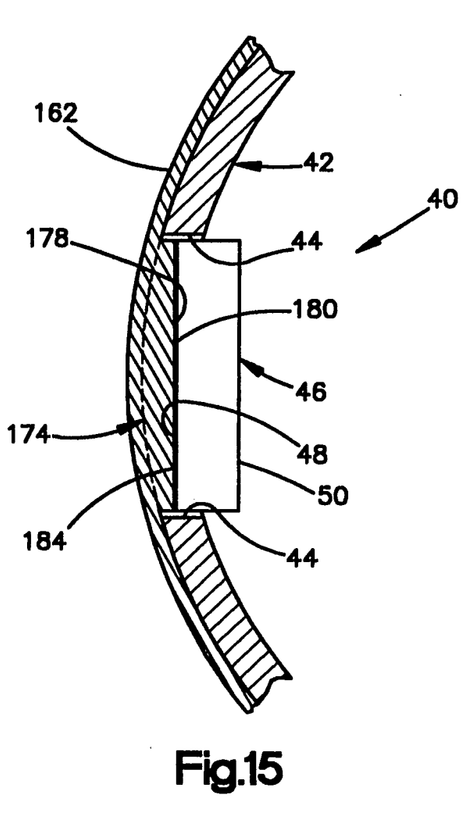
FIG. 15 is a cross-sectional view similar to FIG. 14 wherein a flat target, which is formed as an integral part of a surface ply, is disposed within the opening.

In FIG. 15, an embodiment similar to that of FIGS. 13 and 14 is shown. In the embodiment of FIG. 15, the back surface 178 of the target 174 is flat, and the target 174 is integrally formed with the ply 162 to define a common target/surface ply 162. The flat back surface 178 is parallel with the front surface 48 of flat coil 46, thereby providing a uniform gap 184.

Figure 20:
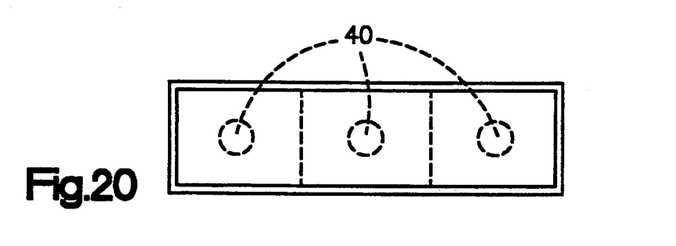
FIG. 20 is a schematic front elevational view of the leading edge of a structural member showing one arrangement of multiple de-icers according to the invention.
Figure 21:
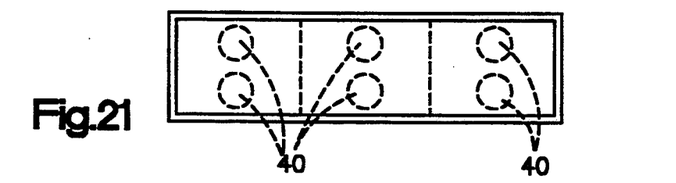
FIG. 21 is a view similar to FIG. 20 showing an alternative arrangement of multiple de-icers according to the invention.
Figure 22:
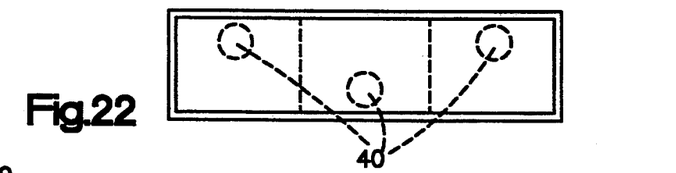
FIG. 22 is a view similar to FIG. 20 showing yet an additional arrangement of multiple de-icers according to the invention.

Referring now to FIGS. 20–22, various spanwise arrangements of the de-icers 40 are illustrated. A detailed discussion of these arrangements is made available in the Attachable Electro-Impulse De-Icer Patent.

Figure 26:
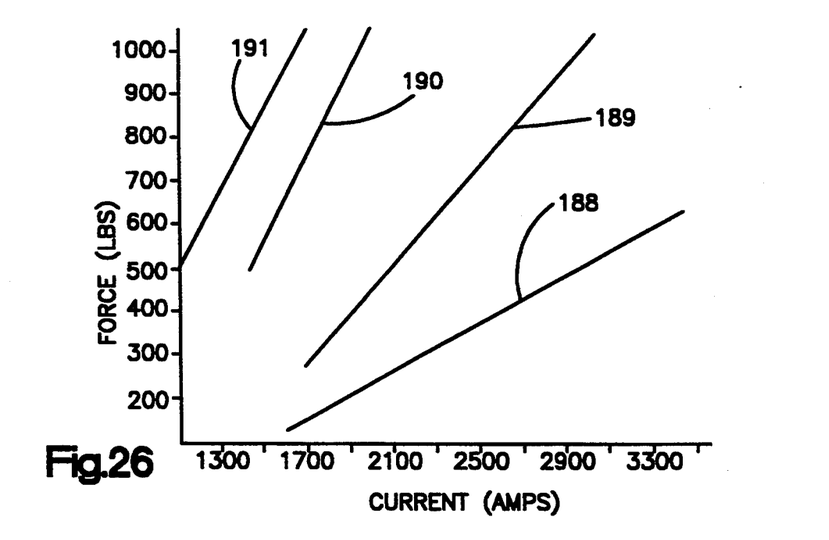
FIG. 26 is a graph of force versus coil current showing the performance of a de-icer in accordance with the present invention compared with prior art mechanical de-icers.

Referring to FIG. 26, a plot of force versus coil current is shown for a laboratory test. Four test results are shown. The lines bearing the reference numerals 188–191, are plots of force versus current for coils operating on the so-called electro-expulsive principle disclosed in the Electro-Repulsive Separation System for De-Icing Patent. The line labeled 191 is a plot of force versus current for a coil operating according to the invention in conjunction with a metal target. Further detailed discussion of lines 188–191, and their significance is made available in the Attachable Electro-Impulse De-Icer Application.

A relatively extensive discussion is provided in the Attachable Electro-Impulse De-Icer Patent regarding characteristic of targets in electro-impulse de-icers. The discussion generally is directed toward the following concepts:

1) the capability of a coil to induce eddy currents in a target and the capability of the target to sustain the eddy currents;
2) the recommended relationship between the area of the coil and the area of the target;
3) the characteristics of the forces acting on the target;
4) the effect of target design on impulse production; and
5) the effect of matching mechanical and electrical periods on target thickness.

Previous test results have utilized a uniform thickness of airfoil skin and/or doubler. It is possible that the thickness and shape of the target, and the spacing of the target from the coil, can be varied to tailor the force distribution along the target and thus maximize the efficiency of force transfer to ice-shedding surfaces.

Although the invention has been described in its preferred form with a certain degree of particularity, it will be understood that the present disclosure of the preferred embodiment has been made only by way of example, and that various changes may be resorted to without departing from the true spirit and scope of the invention as hereinafter claimed. It is intended that the patent shall cover, by suitable expression in the appended claims, whatever features of patentable novelty exist in the invention disclosed.

What is claimed is:

1. A de-icer especially adapted for attachment to a structural member having a skin, the de-icer having an exposed surface susceptible to icing during flight, comprising:
   an opening in the skin;
   a metal plate-like target having a back surface and an opposing front surface and being generally coterminous with the opening the target being disposed over the opening with the back surface facing the opening;
   a deflectable surface ply overlying the front surface of the target and a portion of the skin, the surface ply being attached to the skin and defining the exposed surface of the de-icer; and
   an inductor coil operably connected to the skin disposed over the opening, the coil having a front surface facing the target in close proximity to the back surface of the target, the target being movable away from and toward the coil.

2. The de-icer of claim 1, wherein the back surface of the target is contoured to a shape approximating that of the skin.

3. The de-icer of claim 2, wherein the front surface of the coil is contoured to a shape approximating that of the skin, and the back surface of the target is spaced from the front surface of the coil by a uniform gap.

4. The de-icer of claim 1, wherein the back surface of the target is flat.

5. The de-icer of claim 4, wherein the front surface of the coil is flat, and the back surface of the target is spaced from the front surface of the coil by a uniform gap.

6. The de-icer of claim 1, wherein the target thickness is non-uniform.

7. The de-icer of claim 1, wherein the target is formed as an integral part of the surface ply.

8. The de-icer of claim 2, wherein the front surface of the coil is flat.

9. The de-icer of claim 1, further comprising means to supply a short duration, high-current electrical pulse to the coil.

10. The de-icer of claim 1, wherein the coil includes:
    a first, sheet-like member defined by a first, continuous, electrical conductor having a plurality of turns and first and second ends, said first end of said first conductor defining an electrical input and said second end of said first conductor defining an electrical output;
    a second, sheet-like member defined by a second, continuous, electrical conductor having a plurality of turns and first and second ends, said first end of said second conductor defining an electrical input, and said second end of said second conductor defining an electrical output;
    an electrical connection between said second end of said first conductor and said first end of said second conductor; and
    said first and second sheet-like members being disposed parallel to each other with selected turns of said first electrical conductor being positioned adjacent to selected turns of said second electrical conductor such that said direction of current flow through the turns of said first conductor is in the same direction as the current flow through the turns of said second conductor.

11. The de-icer of claim 10, wherein the coil is formed of multiple overlapped coils.

12. The de-icer of claim 1, wherein the coil is formed as a spiral.

13. The de-icer of claim 1, wherein the coil is formed as a helical metal strip having a central opening.

14. The de-icer of claim 13, further comprising a second coil formed as a helical metal strip, the second coil being disposed within the central opening defined by the first coil.

15. The de-icer of claim 1, wherein the back side of the target is spaced from the front side of the coil by a gap of about 0.005 inch or less.

16. The de-icer of claim 1, wherein the coil is connected to the skin by a retainer that prevents relative movement between the coil and the skin.

17. The de-icer of claim 1 wherein the coil is at least partially disposed within the opening in the skin.

18. The de-icer of claim 17 wherein the coil substantially fills the opening.

19. The de-icer of claim 1 wherein the target is partially disposed within the opening in the skin.

20. The de-icer of claim 19 wherein the target comprises a flange portion that extends beyond the circumference of the opening around the periphery of the target.

21. The de-icer of claim 1 wherein the target is completely disposed within the opening in the skin and substantially fills the opening.

22. The de-icer of claim 21, wherein the target is formed as an integral part of the surface ply.

23. A de-icer especially adapted for attachment to a structural member having a skin, the de-icer having an exposed surface susceptible to icing during flight, comprising:
    an opening in the skin;
    a force transfer member including a stem and a plate-like element having a back surface, the stem being connected to the back surface in a manner that permits transfer of force from the stem to the plate-like element, the plate-like element being disposed over the opening with the stem protruding through the opening;
    a deflectable surface ply overlying the plate-like element and a portion of the skin, the surface ply being attached to the skin and defining the exposed surface of the de-icer;
    a metal target, the metal target being connected to the stem in a manner that permits transfer of force from the target to the stem;
    an inductor coil in close proximity with the target, the force transfer member and target being movable relative to the coils; and,
    a retainer attached to the skin within the opening that holds the inductor coil securely in place.

24. The de-icer of claim 23 further comprising guide members, the guide members guiding and supporting the force transfer member as it moves with the target and plate-like element.

25. The de-icer of claim 23 wherein the plate-like element comprises a flange portion that extends beyond the circumference of the opening around the periphery of the target.

26. A method for de-icing a structural member of the type having a skin, the method comprising the steps of:
    forming an opening in the skin;

providing a metal target having a back surface and an opposing front surface the target being generally coterminous with the opening;

disposing the target over the opening with the back surface of the target facing the opening;

providing a deflectable surface ply;

disposing the surface ply over the front surface of the target and a portion of the skin and attaching the support means to the skin, the surface ply defining an exposed surface susceptible to icing during flight;

providing an inductor coil having a front surface;

disposing the coil over the opening with the front surface of the coil facing the back surface of the target;

operably connecting the coil to the structural member with the front surface of the coil in close proximity to the back surface of the target; and, energizing the coil wherein the target and surface ply are moved away from and toward the coil to dislodge ice accumulated on the exposed surface.

27. The method of claim 26 further comprising the step of disposing a portion of the target within the opening.

28. The method of claim 26 further comprising the step of disposing the target completely within the opening.

29. The method of claim 26 further comprising the steps of:

contouring the back surface of the target to a shape approximating that of the front surface of the coil; and spacing the back surface of the target from the front surface of the coil by a uniform gap.

30. The method of claim 26 further comprising the steps of:

contouring the back surface of the target to a shape approximating that of the skin;

configuring the front surface of the coil to be flat; and spacing the back surface of the target from the front surface of the coil by a non-uniform gap.

31. The method of claim 26, wherein the target is formed as an integral part of the surface ply.

32. A method for de-icing a structural member of the type having a skin, the method comprising the steps of:

forming an opening in the structural member;

providing a force transfer member, the force transfer member including a stem and a plate-like element having a back surface, the stem being connected to the back surface in a manner that permits transfer of force from the stem to the plate-like element;

disposing the plate-like element over the opening with the back surface facing the opening and the stem protruding through the opening;

providing a deflectable surface ply;

disposing the surface ply over the plate-like element and a portion of the skin and attaching the surface ply to the skin, the surface ply defining an exposed surface susceptible to icing during flight;

attaching the surface ply to the skin;

providing a metal target;

connecting the target to the stem in a manner that permits transfer of force from the target to the stem;

providing an inductor coil having a front surface;

disposing the coil within the structural member in close proximity to the target;

providing a retainer that holds the coil securely in place attaching the retainer to the skin within the opening; and energizing the coil wherein the target and surface ply are moved away from and toward the coil to dislodge ice accumulated on the exposed surface.

* * * * *